(12) United States Patent        (10) Patent No.:     US 11,894,925 B2
     Na et al.                    (45) Date of Patent:     Feb. 6, 2024

(54) CHANNEL STATE INFORMATION REFERENCE SIGNAL TRANSMISSION METHOD AND BASE STATION

(71) Applicant: NTT DOCOMO, INC., Tokyo (JP)

(72) Inventors: Chongning Na, Beijing (CN); Huiling Jiang, Beijing (CN); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 748 days.

(21) Appl. No.: 16/080,409

(22) PCT Filed: Feb. 28, 2017

(86) PCT No.: PCT/CN2017/075137
     § 371 (c)(1),
     (2) Date: Aug. 28, 2018

(87) PCT Pub. No.: WO2017/148364
     PCT Pub. Date: Sep. 8, 2017

(65)         Prior Publication Data
     US 2021/0203443 A1    Jul. 1, 2021

(30)      Foreign Application Priority Data
     Feb. 29, 2016   (CN) .......................... 201610113492.4

(51) Int. Cl.
     *H04L 1/00*          (2006.01)
     *H04L 5/00*          (2006.01)
(52) U.S. Cl.
     CPC .......... *H04L 1/0027* (2013.01); *H04L 1/0026* (2013.01); *H04L 5/0005* (2013.01); *H04L 5/0048* (2013.01); *H04L 5/0064* (2013.01)

(58) Field of Classification Search
     None
     See application file for complete search history.

(56)              References Cited
              U.S. PATENT DOCUMENTS

2012/0188955 A1*  7/2012  Zhang ................. H04L 5/005
                                                          370/329
     2012/0208547 A1   8/2012  Geirhofer et al.
                       (Continued)

FOREIGN PATENT DOCUMENTS

CN       103391631 A      11/2013
     CN       104038312 A       9/2014
     CN       104052532 A       9/2014

OTHER PUBLICATIONS

International Search Report issued in PCT/CN2017/075137 dated May 3, 2017 (2 pages).
                       (Continued)

*Primary Examiner* — Saad Khawar
(74) *Attorney, Agent, or Firm* — Osha Bergman Watanabe & Burton LLP

(57)                  ABSTRACT

An embodiment of present disclosure provides a method of transmitting channel state information reference signals, and a base station. An embodiment of the present disclosure provides a method of transmitting channel state information reference signals (CSI-RSs), which is executed by a base station, and this method includes the steps of determining whether or not it is necessary to use aperiodic CSI-RSs in a communication system in which a base station to use periodic CSI-RSs is provided, generating an aperiodic CSI-RS trigger signal and communicating the aperiodic CSI-RS trigger signal to a mobile station when aperiodic CSI-RSs need to be used, and communicating aperiodic CSI-RSs to the mobile station in accordance with the aperiodic CSI-RS trigger signal.

5 Claims, 3 Drawing Sheets

(56) References Cited

U.S. PATENT DOCUMENTS

2016/0227428 A1* 8/2016 Novlan ................. H04L 5/0053
2016/0227519 A1* 8/2016 Nimbalker ............ H04L 5/0094
2016/0227548 A1* 8/2016 Nimbalker .......... H04W 72/042
2016/0295557 A1* 10/2016 Azarian Yazdi .... H04W 72/042
2018/0375560 A1* 12/2018 Wei ......................... H04B 7/04

OTHER PUBLICATIONS

Written Opinion of the International Searching Authority issued in PCT/CN2017/075137 dated May 3, 2017 (3 pages).
Office Action in counterpart Chinese Patent Application No. 201780014070.4 dated Jun. 23, 2021 (16 pages).
Office Action in counterpart Chinese Patent Application No. 201780014070.4 dated Dec. 28, 2021 (17 pages).

* cited by examiner

CHANNEL STATE INFORMATION REFERENCE SIGNAL TRANSMISSION METHOD AND BASE STATION

TECHNICAL FIELD

The present disclosure relates to the field of radio communication, and, more particularly, relates to a method of transmitting channel state information reference signals that can be used in a radio communication system and a base station compatible therewith.

BACKGROUND ART

In successor systems of the LTE system (for example, referred to as "LTE-Advanced" or "LTE-Advanced Pro"), it is becoming increasingly important that a user terminal produces a comprehensive evaluation of the channel quality of channels, taking into account measurements of the spatial characteristics of the channels, measurements of interference and so on, and feeds back information regarding the above evaluation to a radio base station in the form of channel state information (CSI). In successor systems of LTE (for example, Rel. 10), a proposal has been made to use channel state information reference signals (CSI-RSs) as reference signals for measuring channel state information (CSI). To be more specific, a base station transmits CSI-RSs for a mobile station, to the mobile station, using specific time and frequency resources, in a predetermined cycle, so that the mobile station can measure CSI based on the CSI-RSs, and return the measurement results.

Meanwhile, full-dimensional multi-input multiple output (FD-MIMO) and massive multi-input multi-output (massive MIMO) antennas are wireless communication technologies that have been proposed by LTE (Long Term Evolution) Release 13, studied in 3GPP (3rd Generation Partnership Project). Compared with conventional MIMO systems, when data for mobile stations increases, in FD-MIMO and massive MIMO systems, the base station can transmit data using an increased number of antennas, so that the system's throughput can be improved. However, when the number of antennas increases, the overhead of control signaling for CSI-RSs also increases, and therefore the current CSI-RS transmission method cannot be applied to the massive MIMO system.

SUMMARY OF INVENTION

One aspect of the present disclosure provides a method of transmitting channel state information reference signals (CSI-RSs), which is executed by a base station, and this method includes the steps of determining whether or not it is necessary to use aperiodic CSI-RSs in a communication system in which a base station to use periodic CSI-RSs is provided, generating an aperiodic CSI-RS trigger signal and communicating the aperiodic CSI-RS trigger signal to a mobile station when aperiodic CSI-RSs need to be used, and communicating aperiodic CSI-RSs to the mobile station in response to the aperiodic CSI-RS trigger signal.

Another aspect of the present disclosure provides a base station that includes an aperiodic CSI-RS identification section configured to judge whether or not it is necessary to use aperiodic CSI-RSs in a communication system in which a base station to use periodic CSI-RSs is provided, a trigger signal generation section configured to generate an aperiodic CSI-RS trigger signal when aperiodic CSI-RSs need to be used, and a transmission section configured to communicate the aperiodic CSI-RS trigger signal to a mobile station, and communicate aperiodic CSI-RSs to the mobile station in accordance with the aperiodic CSI-RS trigger signal.

By using the above-described channel state information reference signal transmission method and base station according to aspects of the present disclosure, it is possible to transmit CSI-RSs to mobile stations, on an as-needed basis, based on an aperiodic scheme. Consequently, it is possible to adjust the CSI-RSs that need to be transmitted, flexibly, depending on the number of mobile stations in a radio communication system. This allows the radio communication system to support the use of massive MIMO while keeping the increase in control signaling overhead as small as possible.

BRIEF DESCRIPTION OF DRAWINGS

Now, with reference to the accompanying drawings, embodiments of the present disclosure will be described in further detail to clarify the above-described contents of the present disclosure, as well as other objects, features and advantages.

DESCRIPTION OF EMBODIMENTS

Figure 1:
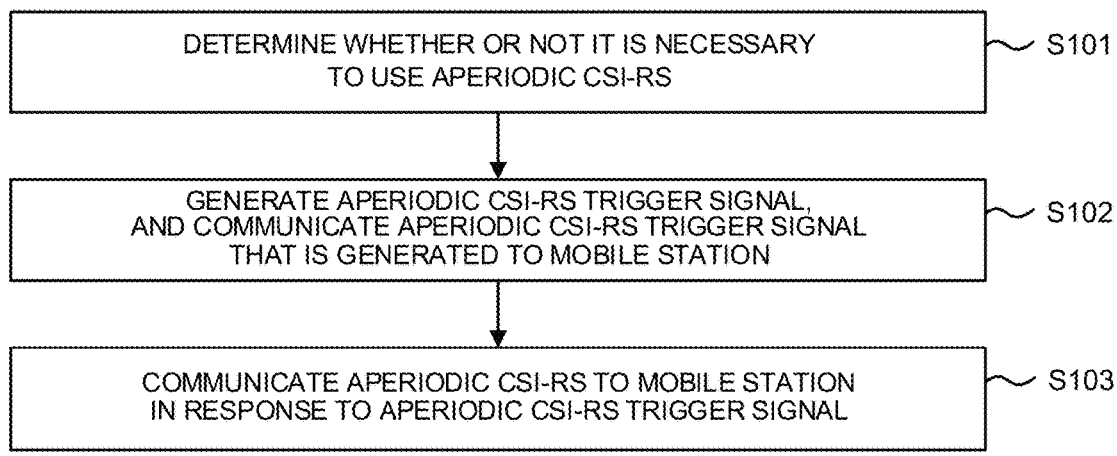
FIG. 1 is a flowchart of a method of transmitting channel state information reference signals, which is performed by a base station, according to an embodiment of the present disclosure.

Now, with reference to the accompanying drawings, the method for transmitting channel state information reference signals and a base station according to an embodiment of present disclosure will be described below. Throughout the accompanying drawings, the same reference numerals refer to the same elements. It should be understood that the embodiments described herein are merely examples and are not to be construed to limit the scope of the present disclosure. Also, UEs as shown herein may be a variety of types of user terminals, including, for example, mobile terminals (also referred to as "mobile stations") or stationary terminals. However, in the following description, "UEs" and "mobile stations" will be used interchangeably, for ease of explanation.

In the herein-contained examples of the present disclosure, a base station can transmit configuration information related to antenna ports, beams, time and frequency resources and so on, which are used to communicate CSI-RSs to a mobile station, via RRC signaling, statically or semi-statically. Then, in accordance with the indications of the configuration information, the base station transmits CSI-RSs to the mobile station in a predetermined cycle, so that the mobile station can measure CSI. In addition, the base station can transmit CSI-RSs based on an aperiodic scheme, if necessary. The mobile station can use CSI-RSs that are transmitted periodically and/or CSI-RSs that are transmitted aperiodically, as reference signals for specifying channel states, such as channel quality indicators (CQIs), precoding matrix indicators (PMIs), rank indicators (RIs), and beam indices. In addition, the mobile station can use CSI-RSs that are transmitted periodically and/or CSI-RSs that are transmitted aperiodically, as reference signals for canceling serial interference. The configuration information may contain information related to one or more CSI-RS resources that can be selected.

Now, the method of transmitting CSI-RSs, which is executed by a base station according to an embodiment of the present disclosure, will be described below with reference to FIG. 1. FIG. 1 is a flowchart to show a CSI-RS transmission method 100. As shown in FIG. 1, in step S101, whether or not it is necessary to use aperiodic CSI-RSs, in a communication system in which a base station to use periodic CSI-RSs is provided, is judged. For example, whether or not it is necessary to use aperiodic CSI-RSs can be judged depending on the number of mobile stations in the serving cell. When the number of mobile stations in the serving cell of the base station increases and exceeds a predetermined threshold, it is possible to judge that aperiodic CSI-RSs need to be used.

When it is necessary to use aperiodic CSI-RSs in step S102, an aperiodic CSI-RS trigger signal is generated, and the aperiodic CSI-RS trigger signal that is generated is communicated to the mobile station. To be more specific, the aperiodic CSI-RS trigger signal is used to command the mobile station to prepare to receive aperiodic CSI-RSs and also measure CSI using aperiodic CSI-RSs.

According to one example of the present disclosure, the aperiodic CSI-RS trigger signal can contain aperiodic CSI-RS type information. The aperiodic CSI-RS type information can indicate what type of aperiodic CSI-RSs the base station transmits to the mobile station, in order to enable the mobile station to measure CSI based on the type of aperiodic CSI-RSs. According to one example of the present disclosure, the aperiodic CSI-RS type information contains elements such as a power element, a precoding element, a shared-use element and/or a measurement element.

For example, aperiodic CSI-RSs may be used for channel measurements or for interference measurements. When the mobile station needs to make channel measurements and feed back channel quality indicators (CQIs), precoding matrix indicators (PMIs), rank indicators (RI) and so on to the base station, the base station can transmit non-zero-power (NZP) aperiodic CSI-RSs to the mobile station. Meanwhile, when the mobile station needs to measure interference, the base station can transmit zero-power (ZP) aperiodic CSI-RSs to the mobile station, so that the mobile station can measure serial interference, and, furthermore, calculate CQIs taking into account the impact of serial interference. Accordingly, the aperiodic CSI-RS type information can contain a power element that indicates whether or not aperiodic CSI-RSs are used for channel measurements or for interference measurements.

Figure 2A:
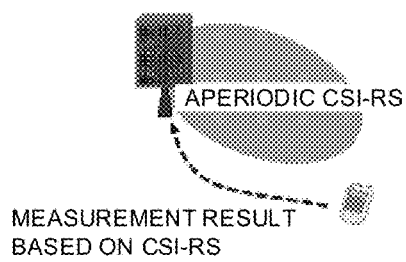
FIG. 2a is a conceptual diagram to show a case where a base station transmits an un-precoded aperiodic CSI-RS to a mobile station.
Figure 2B:
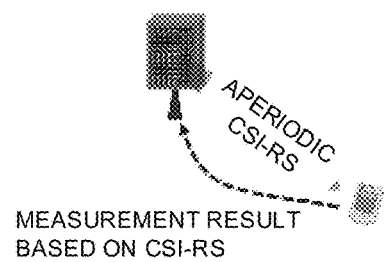
FIG. 2b is a conceptual diagram to show a case where a base station transmits aperiodic CSI-RSs that have been subjected to beamforming to a mobile station.

Also, for example, when the number of mobile stations in a cell increases, the base station can transmit aperiodic CSI-RSs that are not precoded. FIG. 2a is a conceptual diagram to show a case where the base station transmits un-precoded aperiodic CSI-RSs to a mobile station. As shown in FIG. 2a, the base station can transmit aperiodic CSI-RSs to the mobile station without identifying the direction. Alternatively, the base station can apply beamforming to aperiodic CSI-RSs. FIG. 2b is a conceptual diagram to show a case where the base station transmits aperiodic CSI-RSs that have been subjected to beamforming, to a mobile station. Referring to FIG. 2b, the base station applies beamforming to aperiodic CSI-RSs, so that the base station can transmit aperiodic CSI-RSs in a specific direction. Accordingly, the aperiodic CSI-RS type information may contain a precoding element to indicate whether the above aperiodic CSI-RSs have been subjected to a precoding process or whether the above aperiodic CSI-RSs have been subjected to a beamforming process.

Figure 3A:
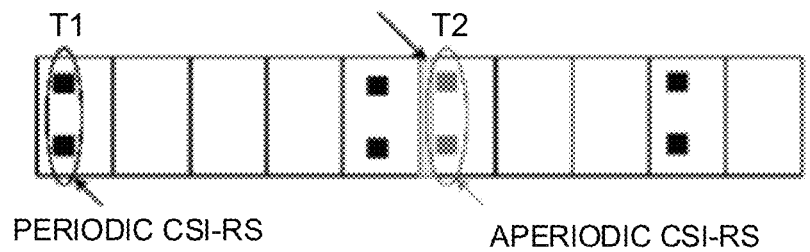
FIG. 3a is a conceptual diagram to show a case where a base station commands a mobile station to make measurements separately based on periodic CSI-RSs and based on aperiodic CSI-RSs.
Figure 3B:
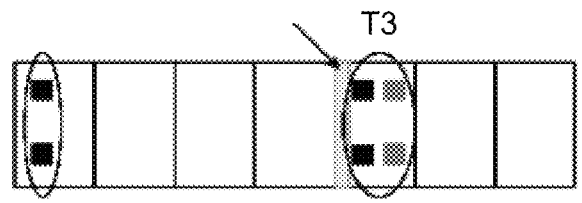
FIG. 3b is a conceptual diagram to show a case where a base station commands a mobile station to make measurements based on both periodic CSI-RSs and aperiodic CSI-RSs.

Furthermore, for example, the base station can command the mobile station to make measurements based only on aperiodic CSI-RSs. FIG. 3a is a conceptual diagram to show a case where a base station commands a mobile station to make measurements separately based on periodic CSI-RSs and based on aperiodic CSI-RSs. Referring to FIG. 3a, the black blocks represent periodic CSI-RSs, and the gray blocks represent aperiodic CSI-RSs. As shown in FIG. 3a, the mobile station performs measurement based on periodic CSI-RSs at time T1, and performs measurement based on aperiodic CSI-RSs at time T2. Alternatively, the base station may command the mobile station to make measurements based on both periodic CSI-RSs and aperiodic CSI-RSs so as to have more accurate measurement results. Referring to FIG. 3b, the black blocks represent periodic CSI-RSs, and the gray blocks represent aperiodic CSI-RSs. FIG. 3b is a conceptual diagram to show a case where a base station commands a mobile station to make measurements based on both periodic CSI-RSs and aperiodic CSI-RSs. As shown in FIG. 3b, at time T3, the mobile station makes measurements based on both periodic CSI-RSs and aperiodic CSI-RSs. Accordingly, the aperiodic CSI-RS type information can contain a shared-use element that indicates whether aperiodic CSI-RSs are used alone for CSI measurements, or used together with periodic CSI-RSs for CSI measurements.

In addition, the base station can transmit aperiodic CSI-RSs by using resources for communicating data. There may be a case where the base station uses part of the data communication resources allocated to the first mobile station to transmit aperiodic CSI-RSs to a second mobile station. In this case, the first mobile station does not need to conduct measurements with respect to the aperiodic CSI-RSs communicated in these data communication resources, but needs to perform rate matching based on the data communication resources that are occupied there. Accordingly, the aperiodic CSI-RS type information may contain a measurement element to command the mobile station to measure CSI based on the above aperiodic CSI-RSs or perform rate matching based on the above aperiodic CSI-RSs.

According to another example of the present disclosure, an aperiodic CSI-RS trigger signal can contain CSI feedback type information. The CSI feedback type information can indicate, to a mobile station, the scheme for sending feedback in response to aperiodic CSI-RSs. For example, the CSI feedback type information may command the mobile station to report measurement results based on aperiodic CSI-RSs and measurement results based on periodic CSI-RSs, individually or together. Also, for example, the CSI feedback type information can designate the mechanism for reporting measurement results, to the mobile station. To be more specific, the CSI feedback type information can command the mobile station to report measurement results based on PUSCH (Physical Uplink Shared CHannel) mechanism, PUCCH (Physical Uplink Control CHannel) mechanism and so on.

The base station can dynamically adjust each element and the CSI feedback type information in the aperiodic CSI-RS type information based on elements such as the distribution and the number of mobile stations in the current cell.

Also, in step S102, the base station can transmit an aperiodic CSI-RS trigger signal using existing downlink control information (DCI) signaling. For example, the base station can use DCI signaling to command the mobile station to perform aperiodic measurements based on CSI-RSs that are transmitted periodically. In step S102, the base station can communicate an aperiodic CSI-RS trigger signal to the mobile station, by using this signaling, so as to trigger the mobile station to perform aperiodic measurements based on periodic CSI-RSs. Alternatively, a new DCI field may be defined in the aperiodic CSI-RS trigger signal, and, furthermore, an aperiodic CSI-RS trigger signal may be transmitted using this new DCI field.

In addition, the base station can also specify the scheme for transmitting the aperiodic CSI-RS trigger signal, in response to an operation that is made by the mobile station based on aperiodic CSI-RSs. To be more specific, the method 100 may include determining whether the mobile station needs to measure CSI based on the above aperiodic CSI-RSs or whether the mobile station needs to perform rate matching. When the mobile station needs to measure CSI based on the above aperiodic CSI-RSs, the above aperiodic CSI-RS trigger signal is communicated to the mobile station, using uplink grant signaling or downlink control signaling. When the mobile station needs to perform rate matching based on the above aperiodic CSI-RSs, it is preferable to communicate the aperiodic CSI-RS trigger signal to the mobile station using downlink grant signaling.

Then, in step S103, in accordance with the aperiodic CSI-RS trigger signal, aperiodic CSI-RSs are communicated to the mobile station. According to one example of the present disclosure, aperiodic CSI-RSs are used to allow specific mobile stations to make measurements. Alternatively, the base station may group the mobile stations in the cell and use aperiodic CSI-RSs for a specific group of mobile stations. In other words, mobile stations in a specific mobile station group can make measurements using the same aperiodic CSI-RS.

According to another example of the present disclosure, it is not necessary to transmit aperiodic CSI-RSs often, so that the base station can occupy the resources for communicating data, and transmit aperiodic CSI-RSs. This makes it possible to improve the flexibility of communicating aperiodic CSI-RSs, and to reduce unnecessary resource overhead. To be more specific, in step S103, when it is not necessary to use aperiodic CSI-RSs, aperiodic CSI-RSs can be communicated to the mobile station using time and frequency resources for communicating data. Also, the bandwidth for use for communicating aperiodic CSI-RSs to a specific mobile station, may be the same as the bandwidth that is used to communicate data to this specific mobile station.

Also, according to another example of the present disclosure, the method 100 shown in FIG. 1 may further include setting the time and/or frequency resources, which the base station can use to transmit aperiodic CSI-RSs, in advance, and storing configuration information of these predetermined resources in the base station and the mobile station. After the base station transmits an aperiodic CSI-RS trigger signal in step S102, the mobile station specifies the resources for transmitting aperiodic CSI-RSs based on the configuration information that is stored, so that the aperiodic CSI-RSs are received in corresponding resources.

The configuration information can specify the time and/or frequency resources for communicating aperiodic CSI-RSs and/or others. As mentioned earlier, the configuration information is can be set in advance and stored in the base station and the mobile station. Therefore, the base station does not need to transmit aperiodic CSI-RS configuration information to the mobile station, and the mobile station can receive aperiodic CSI-RSs by using the configuration information that is stored in advance. Alternatively, the method shown in FIG. 1, may additionally include communicating configuration information for aperiodic CSI-RSs from the base station to the mobile station, instead of storing configuration information in the mobile station in advance.

According to one example of the present disclosure, the configuration information can contain a subframe element and a subframe resource element. Of these, the subframe element specifies subframes for communicating aperiodic CSI-RSs, and the subframe resource element specifies the time and frequency resources for communicating aperiodic CSI-RSs within one subframe. One of the subframe element and the subframe resource element may be set and stored in advance while and the other element is reported from the base station to the mobile station, or both elements may be set and stored in advance. Alternatively, both of these elements may be transmitted from the base station to the mobile station, rather than being stored in advance in the mobile station.

For example, it is possible to set the subframe element in advance, and store the subframe element in the base station and the mobile station. To be more specific, the same subframe as the subframe in which an aperiodic CSI-RS trigger signal is transmitted can be set in advance to transmit an aperiodic CSI-RS. Alternatively, a subframe at a predetermined interval from a subframe in which an aperiodic CSI-RS trigger signal is transmitted may be set to transmit an aperiodic CSI-RS. Therefore, when the mobile station receives an aperiodic CSI-RS trigger signal, the mobile station can specify the subframes for transmitting aperiodic CSI-RSs, based on the subframe element stored in advance and the subframe in which the aperiodic CSI-RS trigger signal is present.

Furthermore, for example, it is possible to set subframe resource elements in advance, and store the subframe resource elements in the base station and the mobile station. To be more specific, given one subframe, the time and frequency resources for communicating a periodic CSI-RS can be set in advance so as to be the same as the time and frequency resources for communicating an aperiodic CSI-RS, and, furthermore, periodic CSI-RSs and aperiodic CSI-RSs can be transmitted in other subframes. In step S103, in a subframe corresponding to an aperiodic CSI-RS trigger signal, the base station can communicate an aperiodic CSI-RS to the mobile station using the same time and frequency resources as the time and frequency resources for communicating a periodic CSI-RS in one subframe. The mobile station can receive an aperiodic CSI-RS in the subframe corresponding to the aperiodic CSI-RS trigger signal, by using the same time and frequency resources as the time and frequency resources in which a periodic CSI-RS is received, in one subframe.

In addition, when the base station transmits configuration information to the mobile station, the base station can communicate configuration information for aperiodic CSI-RSs, to the mobile station, via radio resource control (RRC) signaling. If it is determined in step S101 that there is no need to use aperiodic CSI-RSs, the base station does not generate an aperiodic CSI-RS trigger signal. If no aperiodic CSI-RS trigger signal is received, even if aperiodic CSI-RS configuration information is received in the mobile station, it is determined that there is no aperiodic CSI-RS. On the other hand, when it is determined in step S101 that aperiodic CSI-RSs need to be used, in step S102, the base station generates an aperiodic CSI-RS trigger signal and transmits this signal to the mobile station. Based on the aperiodic CSI-RS trigger signal received and the aperiodic CSI-RS configuration information communicated via RRC signaling, the mobile station specifies the resources occupied by aperiodic CSI-RSs, and receives aperiodic CSI-RSs using the specified resources.

Alternatively, when the base station transmits configuration information to the mobile station, the configuration information is included in the aperiodic CSI-RS trigger signal, so that the base station communicates the aperiodic CSI-RS configuration information to the mobile station using the aperiodic CSI-RS trigger signal. Also, as described above, when the relationship between the subframe for communicating an aperiodic CSI-RS trigger signal and the subframe for communicating an aperiodic CSI-RS is configured in advance and stored, the configuration information in the aperiodic CSI-RS trigger signal may contain only the subframe resource element.

In the method of transmitting channel state information reference signals according to the present embodiment, CSI-RSs are transmitted to mobile stations, when necessary, based on an aperiodic scheme, so that it is possible to adjust the CSI-RSs that need to be transmitted, flexibly, depending on the number of mobile stations in the radio communication system. This allows the radio communication system to support the use of massive MIMO while keeping the increase in control signaling overhead as small as possible.

Figure 4:
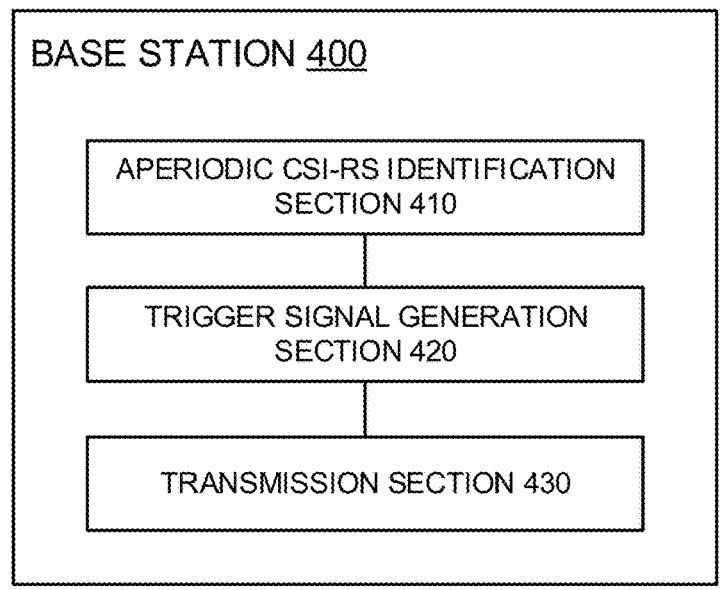
FIG. 4 is a block diagram of a base station according to an embodiment of the present disclosure.

Now, with reference to FIG. 4, the base station according to an embodiment of the present disclosure will be described below. FIG. 4 is a block diagram of a base station 400 according to an embodiment of the present disclosure. As shown in FIG. 4, the base station 400 includes an aperiodic CSI-RS identification section 410, a trigger signal generation section 420, and a transmission section 430. Although the base station 400 may include parts other than these three parts, such parts are not related to the contents of the embodiment of the present disclosure, and therefore will not be illustrated or described herein. Note that since the details of the following operations performed by the base station 400 according to the embodiment of the present disclosure are the same as the details described earlier with reference to FIG. 1 to FIG. 3b, to avoid overlapping explanations, the same details will not be explained again here.

The aperiodic CSI-RS identification section 410 determines whether or not it is necessary to use aperiodic CSI-RSs, in a communication system in which a base station to use periodic CSI-RSs is provided. For example, the aperiodic CSI-RS identification section 410 can determine whether it is necessary to use aperiodic CSI-RSs depending on the number of mobile stations in the serving cell. When the number of mobile stations in the serving cell of the base station increases and exceeds a predetermined threshold, the aperiodic CSI-RS identification section 410 can judge that aperiodic CSI-RSs need to be used.

When it is necessary to use aperiodic CSI-RSs, the trigger signal generation section 420 generates an aperiodic CSI-RS trigger signal. To be more specific, the aperiodic CSI-RS trigger signal can command a mobile station to prepare to receive aperiodic CSI-RSs, and, to measure CSI using aperiodic CSI-RSs.

According to one example of the present disclosure, the aperiodic CSI-RS trigger signal can contain aperiodic CSI-RS type information. The aperiodic CSI-RS type information can indicate what type of aperiodic CSI-RSs the base station transmits to a mobile station, in order to allow the mobile station to measure CSI with ease, depending on the type of aperiodic CSI-RSs. According to one example of the present disclosure, the aperiodic CSI-RS type information contains elements such as a power element, a precoding element, a shared-use element and/or a measurement element.

For example, aperiodic CSI-RSs may be used for channel measurements or for interference measurements. When the mobile station needs to make channel measurements and feed back channel quality indicators (CQIs), precoding matrix indicators (PMIs), rank indicators (RI) and so on to the base station, the base station 400 can transmit non-zero-power aperiodic CSI-RSs to the mobile station. Meanwhile, when the mobile station needs to measure interference, the base station 400 can transmit zero-power aperiodic CSI-RSs to the mobile station, so that the mobile station can measure serial interference, and, furthermore, calculate CQIs taking into account the impact of serial interference. Accordingly, the aperiodic CSI-RS type information can contain a power element that indicates whether or not the aperiodic CSI-RSs are used for channel measurements or for interference measurements.

Also, for example, when the number of mobile stations in a cell increases, the base station can transmit aperiodic CSI-RSs that are not precoded. Alternatively, the base station 400 may apply beamforming to aperiodic CSI-RSs, so that the base station 400 can transmit aperiodic CSI-RSs in a specific direction. Accordingly, the aperiodic CSI-RS type information may contain a precoding element to indicate whether the above aperiodic CSI-RSs have been subjected to a precoding process or whether the above aperiodic CSI-RSs have been subjected to a beamforming process.

Furthermore, for example, the base station 400 can command the mobile station to make measurements based only on aperiodic CSI-RSs. Alternatively, the base station 400 may command the mobile station to make measurements based on both periodic CSI-RSs and aperiodic CSI-RSs, so as to have more accurate measurement results. Accordingly, the aperiodic CSI-RS type information can contain a shared-use element that indicates whether aperiodic CSI-RSs are used alone for CSI measurements, or used together with periodic CSI-RSs for CSI measurements.

In addition, the base station 400 can transmit aperiodic CSI-RSs by using resources for communicating data. There may be a case where the base station uses part of the data communication resources allocated to the first mobile station to transmit aperiodic CSI-RSs to a second mobile station. In this case, the first mobile station does not need to measure the aperiodic CSI-RSs communicated in these data communication resources, but needs to perform rate matching based on the data communication resources that are occupied there. Accordingly, the aperiodic CSI-RS type information may contain a measurement element to command the mobile station to measure CSI based on the above aperiodic CSI-RSs or perform rate matching based on the above aperiodic CSI-RSs.

According to another example of the present disclosure, the aperiodic CSI-RS trigger signal can contain CSI-RS feedback type information. The CSI feedback type information can indicate, to the mobile station, the scheme for sending feedback in response to aperiodic CSI-RSs. For example, the CSI feedback type information may command the mobile station to report measurement results based on aperiodic CSI-RSs and measurement results based on periodic CSI-RSs, individually or together. Also, for example, the CSI feedback type information can designate the mechanism for reporting measurement results, to the mobile station. To be more specific, the CSI feedback type information can command the mobile station to report measurement results based on PUSCH (Physical Uplink Shared CHannel) mechanism, PUCCH (Physical Uplink Control CHannel) mechanism and so on.

The base station 400 can dynamically adjust each element and the CSI feedback type information in the aperiodic CSI-RS type information based on elements such as the distribution and the number of mobile stations in the current cell.

The transmission section 430 can communicate the above-described aperiodic CSI-RS trigger signal to the mobile station, and communicate aperiodic CSI-RSs to the mobile station in accordance with the aperiodic CSI-RS trigger signal. The transmission section 430 can transmit the aperiodic CSI-RS trigger signal using existing downlink control information (DCI) signaling. For example, the base station can use DCI signaling to command the mobile station to perform aperiodic measurements based on CSI-RSs that are transmitted periodically. The transmission section 430 can communicate an aperiodic CSI-RS trigger signal to the mobile station, by using this signaling, so as to trigger the mobile station to perform aperiodic measurements based on periodic CSI-RSs. Alternatively, a new DCI field may be defined in the aperiodic CSI-RS trigger signal, and, furthermore, the transmission section 430 may transmit an aperiodic CSI-RS trigger signal using this new DCI field.

In addition, the transmission section 430 can specify the scheme for transmitting the aperiodic CSI-RS trigger signal, in response to an operation that is made by the mobile station based on aperiodic CSI-RSs. To be more specific, the aperiodic CSI-RS identification section 410 can also determine whether the mobile station needs to measure CSI based on the above aperiodic CSI-RSs or whether the mobile station needs to perform rate matching. When the mobile station needs to measure CSI based on the above aperiodic CSI-RSs, the transmission section 430 communicates the above aperiodic CSI-RS trigger signal to the mobile station, using uplink grant signaling or downlink control signaling. When the mobile station needs to perform rate matching based on the above aperiodic CSI-RSs, it is preferable that the transmission section 430 communicates the aperiodic CSI-RS trigger signal to the mobile station using downlink grant signaling.

According to one example of the present disclosure, aperiodic CSI-RSs are used to allow specific mobile stations to make measurements. Alternatively, the base station may group the mobile stations in the cell, and use aperiodic CSI-RSs for a specific group of mobile stations. In other words, mobile stations in a specific mobile station group can make measurements using the same aperiodic CSI-RS.

According to another example of the present disclosure, it is not necessary to transmit aperiodic CSI-RSs often, so that the transmission section 430 can occupy the resources for communicating data and transmit aperiodic CSI-RSs, which makes it possible to improve the flexibility of communicating aperiodic CSI-RSs, and to reduce unnecessary resource overhead. To be more specific, when it is not necessary to use aperiodic CSI-RSs, the transmission section 430 can communicate aperiodic CSI-RSs to the mobile station using time and frequency resources for communicating data. Also, the bandwidth to use to communicate aperiodic CSI-RSs to a specific mobile station, may be the same as the bandwidth to use to communicate data to this specific mobile station.

Also, one example of the present disclosure sets the time and/or frequency resources which the base station can use to transmit aperiodic CSI-RSs, in advance, and stores configuration information for these predetermined resources in the base station and in the mobile station. After the transmission section 430 transmits an aperiodic CSI-RS trigger signal, the mobile station specifies the resources for transmitting aperiodic CSI-RSs based on the configuration information that tis stored, so that the aperiodic CSI-RSs are received in corresponding resources.

Also, the configuration information can specify the time and/or frequency resources for communicating aperiodic CSI-RSs and/or others. As mentioned earlier, the configuration information is can be set in advance and stored in the base station and the mobile station. Therefore, the base station does not need to transmit aperiodic CSI-RS configuration information to the mobile station, and the mobile station can receive aperiodic CSI-RSs by using the configuration information that is stored in advance. Alternatively, the transmission section 430 may communicate configuration information for aperiodic CSI-RSs to the mobile station, instead of storing configuration information in the mobile station in advance.

According to one example of the present disclosure, the configuration information can contain a subframe element and a subframe resource element. Of these, the subframe element specifies the subframes for communicating aperiodic CSI-RSs, and the subframe resource elements specify the time and frequency resources for communicating aperiodic CSI-RSs in one subframe. One of the subframe element and the subframe resource element may be set and stored in advance while the other element may be reported from the transmission section 430 to a mobile station, or both elements may be set and stored in advance. Alternatively, both of these elements may be transmitted from the transmission section 430 to the mobile station, rather than being stored in advance in the mobile station.

For example, it is possible to set the subframe element in advance, and store the subframe element in the base station and the mobile station. To be more specific, the same subframe as the subframe in which an aperiodic CSI-RS trigger signal is transmitted may be set in advance to transmit an aperiodic CSI-RS. Alternatively, a subframe at a predetermined interval from the subframe in which an aperiodic CSI-RS trigger signal is transmitted can be set to transmit an aperiodic CSI-RS. Therefore, when the mobile station receives an aperiodic CSI-RS trigger signal, the mobile station can specify the subframes for transmitting aperiodic CSI-RSs based on the subframe element stored in advance and the subframe in which the aperiodic CSI-RS trigger signal is present.

Furthermore, for example, it is possible to set subframe resource elements in advance, and store the subframe resource elements in the base station and the mobile station. To be more specific, given one subframe, the time and frequency resources for communicating a periodic CSI-RS can be set in advance so as to be the same as the time and frequency resources for communicating an aperiodic CSI-RS, and, furthermore, periodic CSI-RSs and aperiodic CSI-RSs can be transmitted in other subframes. In a subframe corresponding to an aperiodic CSI-RS trigger signal, the transmission section 430 can communicate an aperiodic CSI-RS to the mobile station using the same time and frequency resources as the time and frequency resources for communicating a periodic CSI-RS in a given one subframe. In the subframe corresponding to the aperiodic CSI-RS trigger signal, the mobile station can receive an aperiodic CSI-RS by using the same time and frequency resources as the time and frequency resources in which a periodic CSI-RS is received in a given subframe.

In addition, when the transmission section 430 transmits configuration information to a mobile station, the transmission section 430 can communicate configuration information for aperiodic CSI-RSs to the mobile station using radio resource control (RRC) signaling. When the aperiodic CSI-RS identification section 410 determines that there is no need to use aperiodic CSI-RSs, the base station does not generate an aperiodic CSI-RS trigger signal. If no aperiodic CSI-RS trigger signal is received, even if aperiodic CSI-RS configuration information is received in the mobile station, it is determined that there is no aperiodic CSI-RS. On the other hand, when the aperiodic CSI-RS identification section 410 determines that it is necessary to use aperiodic CSI-RSs, the trigger signal generation section 420 generates an aperiodic CSI-RS trigger signal, and then the transmission section 430 transmits the aperiodic CSI-RS trigger signal that is generated, to the mobile station. Based on the aperiodic CSI-RS trigger signal received and the aperiodic CSI-RS configuration information communicated via RRC signaling, the mobile station specifies the resources occupied by aperiodic CSI-RSs, and receives aperiodic CSI-RSs using the specified resources.

Alternatively, when the transmission section 430 transmits configuration information to the mobile station, the configuration information is included in the aperiodic CSI-RS trigger signal, so that the transmission section 430 communicates the aperiodic CSI-RS configuration information to the mobile station in the aperiodic CSI-RS trigger signal. Also, as described above, when the relationship between the subframe for communicating an aperiodic CSI-RS trigger signal and the subframe for communicating an aperiodic CSI-RS is configured in advance and stored, the configuration information in the aperiodic CSI-RS trigger signal may contain only the subframe resource element.

The radio base station according to the present embodiment transmits CSI-RSs to mobile stations, when necessary, based on an aperiodic scheme, so that it is possible to adjust the CSI-RSs that need to be transmitted, flexibly, depending on the number of mobile stations in the radio communication system. This allows the radio communication system to support the use of massive MIMO while keeping the increase in control signaling overhead as small as possible.

Figure 5:
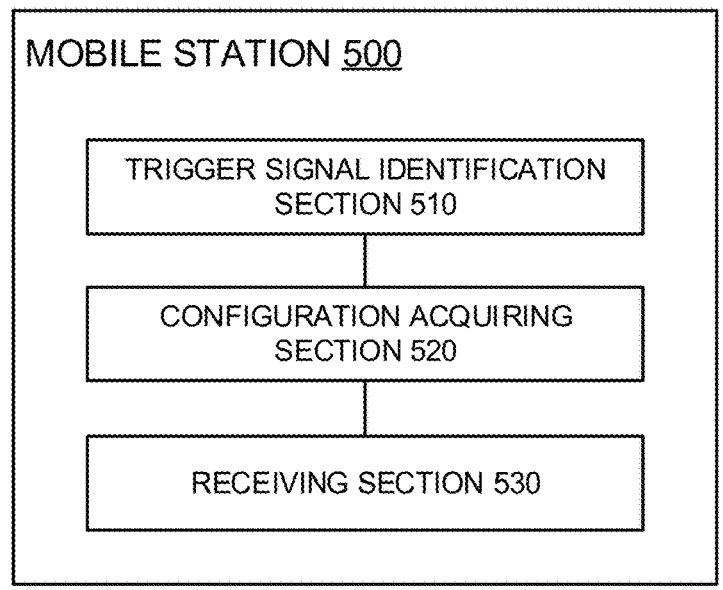
FIG. 5 is a block diagram of a mobile station according to an embodiment of the present disclosure.

Also, according to the embodiment of the present disclosure, base station-based settings can be applied to mobile stations as well. FIG. 5 is a block diagram of a mobile station 500 according to an embodiment of the present disclosure. As shown in FIG. 5, the mobile station 500 includes a trigger signal identification section 510, a configuration acquiring section 520, and a receiving section 530. The trigger signal identification section 510 can judge whether or not an aperiodic CSI-RS trigger signal has been received from a base station. When an aperiodic CSI-RS trigger signal is received, the configuration acquiring section 520 can specify the time and/or frequency resources for communicating aperiodic CSI-RSs, based on data that is stored in advance or based on configuration information that is transmitted from the base station. Then, the receiving section 530 receives aperiodic CSI-RSs by using the resources acquired in the configuration acquiring section 520.

According to one example of the present disclosure, the mobile station 500 may further comprise a CSI measurement section and a reporting section. An aperiodic CSI-RS trigger signal may contain aperiodic CSI-RS type information and/or CSI feedback type information. Based on the aperiodic CSI-RS type information, the CSI measurement section can specify the type of an aperiodic CSI-RS that is received, and execute CSI measurements in accordance with the type that is specified. Also, the reporting section can identify the reporting scheme which the base station has specified to the mobile station, from the CSI feedback type information, and the result of CSI measurements can be transmitted to the base station based on the specified report-type scheme.

The operations of the base station 400 and the mobile station 500 may be implemented with hardware, may be implemented with software modules that are executed on a processor, or may be implemented with combinations of both.

The software modules may be arranged in a storage medium of any format such as, for example, a RAM (Read Access Memory), a flash memory, a ROM (Read Only Memory), an EPROM (Erasable Programmable ROM), an EEPROM (Electrically Erasable Programmable ROM), a register, a hard disk, a removable disk and a CD-ROM.

The storage medium may be connected a processor so that the processor can write information to or read information from the storage medium. The storage medium may be integrated in a processor. The storage medium and the processor may be installed in an ASIC. The ASIC may be installed in the base station 400 and the mobile station 500. The storage medium and the processor may be arranged as separate parts in the base station 400 and the mobile station 500.

Therefore, although the present disclosure has been described in detail based on the above embodiment, it will be apparent to those skilled in the art that the present disclosure is not limited to the embodiments described herein. The present disclosure can be implemented with various corrections and in various modifications, without departing from the scope of the present invention defined by the recitations of claims.

Consequently, the description herein is provided only for the purpose of explaining examples, and should by no means be construed to limit the present disclosure in any way.

The invention claimed is:

1. A terminal among a terminal group comprising a plurality of terminals which is grouped in a cell, comprising:
    a receiver that receives configuration information using radio resource control (RRC) signaling, an aperiodic Channel State Information Reference Signal (CSI-RS) to be used for the terminal group, and a trigger signal using a downlink control information (DCI) field which indicates the aperiodic CSI-RS in a frequency domain in a bandwidth that is the same as a bandwidth for a time and frequency resource that is used for data transmission to the terminal; and
    a processor,
    wherein if the trigger signal is received then the processor, based on the received configuration information and the received trigger signal, specifies a time and frequency resource for the aperiodic CSI-RS from a plurality of time and frequency resources,
    the processor performs rate matching related to the specified time and frequency resource based on the trigger signal, and wherein if the trigger signal is not received and the configuration information is received, the processor determines not to use the aperiodic CSI-RS.

2. The terminal according to claim 1, wherein whether or not it is necessary to use the aperiodic CSI-RS is determined based on a number of terminals in a serving cell.

3. A communication method for a terminal among a terminal group comprising a plurality of terminals which is grouped in a cell, comprising:
   receiving configuration information using radio resource control (RRC) signaling and an aperiodic Channel State Information Reference Signal (CSI-RS) to be used for the terminal group, and receiving a trigger signal using a downlink control information (DCI) field which indicates the aperiodic CSI-RS in a frequency domain in a bandwidth that is the same as a bandwidth for a time and frequency resource that is used for data transmission to the terminal;
   if the trigger signal is received then, based on the received configuration information and the received trigger signal, specifying a time and frequency resource for the aperiodic CSI-RS from a plurality of time and frequency resources; and
   performing rate matching related to the specified time and frequency resource based on the trigger signal, and if the trigger signal is not received and the configuration information is received, determining not to use the aperiodic CSI-RS.

4. A base station comprising:
   a transmitter that transmits configuration information using radio resource control (RRC) signaling, an aperiodic Channel State Information Reference Signal (CSI-RS) to be used for a terminal group comprising a plurality of terminals which is grouped in a cell, and a trigger signal using a downlink control information (DCI) field which indicates the CSI-RS; and
   a processor that controls to transmit the DCI field as the trigger signal which indicates the CSI-RS in a frequency domain in a bandwidth that is the same as a bandwidth for a time and frequency resource that is used for data transmission to a terminal of the terminal group,
   wherein if the terminal receives the trigger signal then the terminal, based on the configuration information and the trigger signal, specifies a time and frequency resource for the aperiodic CSI-RS from a plurality of time and frequency resources, and
   the terminal performs rate matching related to the specified time and frequency resource based on the trigger signal, and
   wherein if the terminal does not receive the trigger signal and the terminal receives the configuration information, the terminal determines not to use the aperiodic CSI-RS.

5. A system comprising a base station and a terminal among a terminal group comprising a plurality of terminals which is grouped in a cell, wherein
   the terminal comprises:
   a receiver that receives configuration information using radio resource control (RRC) signaling, an aperiodic Channel State Information Reference Signal (CSI-RS) to be used for the terminal group, and a trigger signal using a downlink control information (DCI) field which indicates the aperiodic CSI-RS in a frequency domain in a bandwidth that is the same as a bandwidth for a time and frequency resource that is used for data transmission to the terminal; and
   a processor,
   wherein if the trigger signal is received then the processor, based on the received configuration information and the received trigger signal, specifies a time and frequency resource for the aperiodic CSI-RS from a plurality of time and frequency resources, and
   the processor performs rate matching related to the specified time and frequency resource based on the trigger signal, and
   if the trigger signal is not received and the configuration information is received, the processor determines not to use the aperiodic CSI-RS, and the base station comprises:
   a transmitter that transmits the configuration information using the RRC signaling, the aperiodic CSI-RS to be used for the terminal group, and the DCI field.

* * * * *